United States Patent Office 3,322,818
Patented May 30, 1967

3,322,818
NEW BENZOYLPHENYL CARBAMATES
Arthur R. Hanze, Kalamazoo, Mich., assignor to The Upjohn Company, Kalamazoo, Mich., a corporation of Delaware
No Drawing. Filed Mar. 4, 1963, Ser. No. 262,325
2 Claims. (Cl. 260—479)

This invention relates to new and useful chemical compounds and more particularly to benzoylphenyl carbamates which are useful antifungal agents and are pharmacologically useful as anti-inflammatory agents.

The novel compounds of the present invention are represented by the following structural formula:

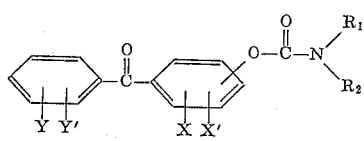

(I)

wherein $R_1$ and $R_2$ taken individually represent a member selected from the group consisting of hydrogen, alkyl of from 1 to 4 carbon atoms, inclusive, and alkenyl of from 3 to 4 carbon atoms, inclusive, and taken together with —N< represent saturated heterocyclic amino selected from the group consisting of unsubstituted and mono- and polyalkyl substituted piperidino, morpholino, thiamorpholino, pyrrolidino, hexamethylenimino, heptamethylenimino, octamethylenimino, and homomorpholino wherein each alkyl is of from 1 to 4 carbon atoms, inclusive. X, X', Y, and Y' are members selected from the group consisting of hydrogen, halogen, nitro, alkyl and alkenyl of from 1 to 4 carbon atoms, inclusive, and alkoxy and alkenyloxy of from 1 to 4 carbon atoms, inclusive.

Representative groups within the scope of the present invention include: alkyl, e.g., methyl, ethyl, propyl, isopropyl, butyl, sec.butyl, tert.butyl, and isobutyl; alkenyl, e.g., vinyl, allyl, methallyl, and crotyl; halogen, e.g., fluoro, chloro, bromo, and iodo; alkoxy, e.g., methoxy, ethoxy, propoxy, isopropoxy, butoxy, and tert.butoxy; alkenyloxy, e.g., allyloxy, propenyloxy, isopropenyloxy, methylallyloxy, and butenyloxy; and saturated heterocyclic amino, e.g., piperidino, morpholino, thiamorpholino, pyrrolidino, hexamethylenimino, heptamethylenimino, octamethylenimino, homomorpholino, 2-methylhexamethylenimino, 2,2-dibutylhexamethylenimino, 3,6-dimethylhexamethylenimino, 2-ethylmorpholino, 2-ethyl-5-methylmorpholino, 3,3-dimethylmorpholino, 3-methylthiamorpholino, 2,3,5,6-tetramethylthiamorpholino, 2,3,6-trimethylthiamorpholino, 2-methylpiperidino, 3-methylpiperidino, 4-methylpiperidino, 2-butylpiperidino, 2-propylpiperidino, 4 - isopropylpiperidino, 3,4 - diethylpiperidino, 2-sec.butylpyrrolidino, 2,2-dimethylpyrrolidino, 2-ethylpyrrolidino, 3,4-dimethylpyrrolidino, and 2-isopropylpyrrolidino.

The starting material for the preparation of the compounds of the present invention is a hydroxybenzophenone of the formula:

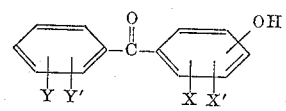

(II)

wherein X, X', Y, and Y' are as hereinbefore defined.

Compounds of the present invention of Formula I wherein $R_1$ is hydrogen and $R_2$ is alkyl or alkenyl (i.e., monoalkyl- and monoalkenylcarbamates) are readily prepared by condensing a hydroxybenzophenone of the Formula II with an alkyl or alkenyl isocyanate, for example, methyl, ethyl, propyl, isopropyl, butyl, isobutyl, allyl, and crotyl isocyanate, in the presence of an inert organic solvent, for example, tetrahydrofuran, diethyl ether, diisopropyl ether, dioxane, pyridine, and the like. The reactants are preferably mixed in substantially equimolar proportions, but, if desired, an excess of either reactant can be used. The reaction proceeds at temperatures between about 15° C. and about 100° C. and can be accelerated by adding a small amount of a base such as triethylamine. Illustratively, the carbamates are readily obtained by allowing the reaction mixture to stand overnight at about 25° C. The product is recovered by conventional means such as filtration, or concentration of the reaction mixture followed by filtration, washing, and recrystallization.

The compounds of Formula I are also prepared by reacting a compound of the Formula II, preferably in the form of an alkali metal salt, e.g., sodium or potassium salt, with phosgene to form the corresponding chloroformate of the formula:

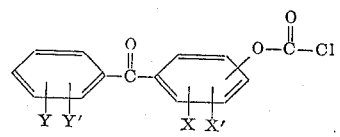

(III)

wherein X, X', Y, and Y' are as given above, and then reacting the chloroformate with ammonia or a monoalkylamine, a monoalkenylamine, a dialkylamine, dialkenylamine, an alkylalkenylamine, or a saturated heterocyclic amine such as unsubstituted and mono- and polyalkyl substituted piperidine, morpholine, thiamorpholine, pyrrolidine, hexamethylenimine, heptamethylenimine, or octamethylenimine, and homomorpholine wherein each alkyl is of from 1 to 4 carbon atoms, inclusive.

The chloroformate is prepared by mixing a compound of the Formula II, an aqueous solution of a base, for example, sodium or potassium hydroxide, and a solution of phosgene in an inert organic solvent, for example, toluene, benzene, diethyl ether, and the like. This reaction is exothermic and is advantageously carried out at temperatures between about —30° C. and about +30° C. The phosgene:organic solvent solution is added slowly and with mixing to prevent localized heating or undesirable temperatures above 30° C. The chloroformate, thus formed, accumulates in the organic phase and the aqueous phase is separated. The chloroformate can be isolated and purified by recrystallization or distillation, or it can be used without further purification in the preparation of the carbamates of the present invention.

The reaction of ammonia or an amine of the kind noted above and the chloroformate is carried out in the presence of a solvent, for example, water, diethyl ether, and dioxane. The reaction is advantageously carried out at temperatures in the range of about 10° C. to about 50° C. The rate of reaction is slow at temperatures below about 10° C.; at temperatures above about 50° C., the ammonia or amine can volatilize and decomposition of the chloroformate intermediate or carbamate product can occur. Stoichiometrically, the reaction requires one mole of amine for each mole of chloroformate. However, the reaction produces one mole of hydrogen chloride, so an excess of the amine, preferably about at least one mole excess, or another suitable acid acceptor, for example, triethylamine, pyridine, picoline, sodium hydroxide, and the like should be employed. The carbamate product of the Formula I is recovered by conventional methods, for example, filtering off any solids, removing the solvent, washing and recrystallization from a suitable solvent.

Alternatively, the compound of the Formula I can be prepared by reacting a carbamyl halide, for example, dimethylcarbamyl chloride, propylcarbamyl chloride, and the like, with a hydroxybenzophenone having Formula II above.

The following examples are illustrative of the preparation of the active compounds of the present invention but are not to be construed as limiting.

*Example 1.—4-benzoylphenyl methylcarbamate*

4-hydroxybenzophenone (1.98 g.; 10 millimoles), 1.76 ml. of a toluene solution of methyl isocyanate containing 11 millimoles of the latter, and 4 drops of triethylamine were dissolved in 25 ml. of tetrahydrofuran. The solution was allowed to stand overnight at 25° C. Addition of diethyl ether did not cause precipitation. The solvents were removed by distillation under reduced pressure while maintaining the temperature below 40° C. The solid residue was dissolved in acetone and technical hexane (essentially a mixture of methyl-substituted pentanes and n-hexane having a boiling range of 60 to 68° C.) was added dropwise to cause precipitation of solid material which was isolated by filtration and dried under reduced pressure. There was thus obtained 1.15 g. (45% yield) of 4-benzoylphenyl methylcarbamate melting at 120–120.5° C.

*Analysis.*—Calcd. for $C_{15}H_{13}NO_3$: C, 70.58; H, 5.13; N, 5.48. Found: C, 70.69; H, 5.50; N, 5.37.

*Example 2.—4-(4-bromobenzoyl)phenyl ethylcarbamate*

Following the procedure of Example 1, but substituting 4'-bromo-4-hydroxybenzophenone for 4-hydroxybenzophenone and ethyl isocyanate for methyl isocyanate, 4-(4-bromobenzoyl)-phenyl ethylcarbamate is obtained.

*Example 3.—4-(4-nitrobenzoyl)phenyl ethylcarbamate*

Following the procedure of Example 1, but substituting 4-hydroxy-4'-nitrobenzophenone for 4-hydroxybenzophenone and ethyl isocyanate for methyl isocyanate, 4-(4-nitrobenzoyl)-phenyl ethylcarbamate is obtained.

*Example 4.—3-chloro-4-benzoylphenyl propylcarbamate*

Following the procedure of Example 1, but substituting 2-chloro-4-hydroxybenzophenone for 4-hydroxybenzophenone and propyl isocyanate for methyl isocyanate, 3-chloro-4-benzoylphenyl propylcarbamate is obtained.

*Example 5.—3-chloro-4-(4-chlorobenzoyl)phenyl isopropylcarbamate*

Following the procedure of Example 1, but substituting 2,4'-dichloro-4-hydroxybenzophenone for 4-hydroxybenzophenone and isopropyl isocyanate for methyl isocyanate, 3-chloro-4-(4-chlorobenzoyl)phenyl isopropylcarbamate is obtained.

*Example 6.—2,6-dibromo-4-benzoylphenyl isopropylcarbamate*

Following the procedure of Example 1, but substituting 3,5-dibromo-4-hydroxybenzophenone for 4-hydroxybenzophenone and isopropyl isocyanate for methyl isocyanate, 2,6-dibromo-4-benzoylphenyl isopropylcarbamate is obtained.

*Example 7.—2,4-dichloro-6-(4-chlorobenzoyl)phenyl butylcarbamate*

Following the procedure of Example 1, but substituting 2-hydroxy-3',4',5-trichlorobenzophenone for 4-hydroxybenzophenone and butyl isocyanate for methyl isocyanate, 2,4-dichloro-6-(4-chlorobenzoyl)phenyl butylcarbamate is obtained.

*Example 8.—4-(2-methylbenzoyl)phenyl isobutylcarbamate*

Following the procedure of Example 1, but substituting 4-hydroxy-2'-mtehylbenzophenone for 4-hydroxybenzophenone and isobutyl isocyanate for methyl isocyanate, 4-(2-methylbenzoyl)phenyl isobutylcarbamate is obtained.

*Example 9.—3-methyl-6-(4-methylbenzoyl)phenyl allylcarbamate*

Following the procedure of Example 1, but substituting 4,4'-dimethyl-2-hydroxybenzophenone for 4-hydroxybenzophenone and allyl isocyanate for methyl isocyanate, 3-methyl-6-(4-methylbenzoyl)phenyl allylcarbamate is obtained.

*Example 10.—4-benzoyl-5-isopropyl-2-methylphenyl crotylcarbamate*

Following the procedure of Example 1, but substituting 4-hydroxy-2-isopropyl-5-methylbenzophenone for 4-hydroxybenzophnoene and crotyl isocyanate for methyl isocyanate, 4-benzoyl-5-isopropyl-2-methylphenyl crotylcarbamate is obtained.

*Example 11.—2-isopropyl-5-methyl-4-(4-methylbenzoyl) phenyl dimethylcarbamate*

(A) *2-isopropyl-5-methyl-4-(4-methylbenzoyl)phenyl chloroformate.*—53.6 grams (0.2 mole) of 2,4'-dimethyl-4-hydroxy-5-isopropylbenzophenone and 8.0 grams (0.2 mole) of sodium hydroxide are added to 150 ml. of water. To this aqueous solution is added a solution of 19.8 grams (0.2 mole) of phosgene in 120 ml. of toluene, prepared by bubbling phosgene into toluene at −10° C. The phosgene:toluene solution is added slowly with mechanical stirring while maintaining the temperature below 25° C. The reaction mixture is stirred for 1.5 hours and filtered to remove solids. The aqueous layer is separated from the organic layer in a separatory funnel and the organic layer washed with 200-ml. portions of 5% aqueous potassium hydroxide solution. The toluene solution is washed with water until neutral and then dried over anhydrous sodium sulfate. The toluene is removed by distillation to leave 2-isopropyl-5-methyl-4-(4-methylbenzoyl)phenyl chloroformate as a residue.

(B) *2-isopropyl-5-methyl 4-(4-methylbenzoyl)phenyl dimethylcarbamate.*—To a solution of 33.0 grams (0.1 mole) of 2-isopropyl-5-methyl-4-(4-methylbenzoyl)phenyl chloroformate in 200 ml. of anhydrous diethyl ether is added 9.0 grams (0.2 mole) of dimethylamine dissolved in 100 ml. of anhydrous ether. The reaction flask is stirred during the addition to prevent localized heating. The reaction mixture is allowed to stand overnight during which time a precipitate forms. The precipitate is removed by filtration and the ether by means of distillation under reduced pressure to provide 2-isopropyl-5-methyl-4-(4-methylbenzoyl)phenyl dimethylcarbamate.

*Example 12.—4-(4-methoxybenzoyl)phenyl carbamate*

Following the procedure of Example 11, part A, substituting 4-hydroxy-4'-methoxybenzophenone for 2,4'-dimethyl-4-hydroxy-5-isopropylbenzophenone, the respective chloroformate is obtained. Following the procedure of part B, commencing with 4-(4-methoxybenzoyl)phenyl chloroformate and substituting ammonia for dimethylamine, 4-(4-methoxybenzoyl)phenyl carbamate is obtained.

*Example 13.—2-(3,4-dimethoxybenzoyl)phenyl (2-methylallyl)-carbamate*

Following the procedure of Example 11, part A, substituting 3',4'-dimethoxy-2-hydroxybenzophenone for 2,4'-dimethyl-4-hydroxy-5-isopropylbenzophenone, the respective chloroformate is obtained. Following the procedure of part B, commencing with 2-(3,4-dimethoxybenzoyl) phenyl chloroformate and substituting (2-methylallyl) amine for dimethylamine, 2-(3,4-dimethoxybenzoyl)phenyl (2-methylallyl)carbamate is obtained.

*Example 14.—4-(4-methoxybenzoyl)-2-methylphenyl methylethylcarbamate*

Following the procedure of Example 11, part A, substituting 4-hydroxy-4'-methoxy-3-methylbenzophenone for 2,4'-dimethyl-4-hydroxy-5-isopropylbenzophenone, the respective chloroformate is obtained. Following the procedure of part B, commencing with 4-(4-methoxybenzoyl)-2-methylphenyl chloroformate and substituting methylethylamine for dimethylamine, 4-(4-methoxybenzoyl)-2-methylphenyl methyelthylcarbamate is obtained.

*Example 15.—4-(4-methoxybenzoyl)-2-methylphenyl dicrotylcarbamate*

Following the procedure of Example 14, part B, commencing with 4-(4-methoxybenzoyl) - 2 - methylphenyl chloroformate and substituting dicrotylamine for methylethylamine, 4-(4-methoxybenzoyl) - 2 - methylphenyl dicrothylcarbamate is obtained.

*Example 16.—2-methyl-4-(3-nitrobenzoyl)phenyl tetramethylenecarbamate*

Following the procedure of Example 11, part A, substituting 4-hydroxy - 3 - methyl-3'-nitrobenzophenone for 2,4'-dimethyl - 4 - hydroxy-5-isopropylbenzophenone, the respective chloroformate is obtained. Following the procedure of part B, commencing with 2-methyl-4-(3-nitrobenzoyl)phenyl chloroformate and substituting pyrrolidine for dimethylamine, 2-methyl-4-(3-nitrobenzoyl)-phenyl tetramethylenecarbamate is obtained.

*Example 17.—2-(4-vinylbenzoyl)-5-vinylphenyl pentamethylenecarbamate*

Following the procedure of Example 11, part A, substituting 4,4'-divinyl-2-hydroxybenzophenone for 2,4'-dimethyl-4-hydroxy-5-isopropylbenzophenone, the respective chloroformate is obtained. Following the procedure of part B, commencing with 2-(4-vinylbenzoyl)-5-vinylphenyl chloroformate and substituting piperidine for dimethylamine, 2-(4-vinylbenzoyl) - 5 - vinylphenyl pentamethylenecarbamate is obtained.

*Example 18.—2-(2-bromobenzoyl)4-tert.butylphenyl hexamethylenecarbamate*

Following the procedure of Example 11, part A, substituting 2'-bromo-5-tert.butyl - 2 - hydroxybenzophenone for 2,4'-dimethyl-4-hydroxy - 5 - isopropylbenzophenone, the respective chloroformate is obtained. Following the procedure of part B, commencing with 2-(2-bromobenzoyl)-4-tert.butylphenyl chloroformate and substituting hexamethylenimine for dimethylamine, 2-(2-bromobenzoyl)-4-tert.butylphenyl hexamethylenecarbamate is obtained.

*Example 19.—2-(2-bromobenzoyl)-4-tert.butylphenyl heptamethylenecarbamate*

Following the procedure of Example 18, part B, commencing with 2-(2-bromobenzoyl) - 4 - tert.butylphenyl chloroformate and substituting heptamethylenimine for hexamethylenimine, 2-(2-bromobenzoyl) - 4 - tert.butylphenyl heptamethylenecarbamate is obtained.

*Example 20.—4-(2-methoxybenzoyl)-2-methylphenyl octamethylenecarbamate*

Following the procedure of Example 11, part A, substituting 4-hydroxy-2'-methoxy - 5 - methylbenzophenone for 2,4'-dimethyl-4-hydroxy - 5 - isopropylbenzophenone, the respective chloroformate is obtained. Following the procedure of part B, commencing with 4-(2-methoxybenzoyl)-2-methylphenyl chloroformate and substituting octamethylenimine for dimethylamine, 4-(2-methoxybenzoyl)-2-methylphenyl octamethylenecarbamate is obtained.

*Example 21.—4-(2-methoxybenzoyl)phenyl (1,1-dimethyltetramethylene)carbamate*

Following the procedure of Example 11, part A, substituting 4-hydroxy-2'-methoxybenzophenone for 2,4'-dimethyl-4-hydroxy-5-isopropylbenzophenone, the respective chloroformate is obtained. Following the procedure of part B, commencing with 4-(2-methoxybenzoyl)phenyl chloroformate and substituting 2,2-dimethylpyrrolidine for dimethylamine, 4-(2-methoxybenzoyl)phenyl (1,1-dimethyltetramethylene)carbamate is obtained.

*Example 22.—2-(4-ethoxybenzoyl)-5-ethoxyphenyl (1-methylpentamethylene)carbamate*

Following the procedure of Example 11, part A, substituting 4,4'-diethoxy-2-hydroxybenzophenone for 2,4'-dimethyl-4-hydroxy-5-isopropylbenzophenone, the respective chloroformate is obtained. Following the procedure of part B, commencing with 2-(4-ethoxybenzoyl)-5-ethoxyphenyl chloroformate and substituting 2-methylpiperidine for dimethylamine, 2-(4-ethoxybenzoyl)-5-ethoxyphenyl (1-methylpentamethylene)carbamate is obtained.

*Example 23.—2-(4-methoxybenzoyl)-4-methylphenyl (2-methylpentamethylene)carbamate*

Following the procedure of Example 11, part A, substituting 2-hydroxy-4'-methoxy - 5 - methylbenzophenone for 2,4'-dimethyl-4-hydroxy - 5 - isopropylbenzophenone, the respective chloroformate is obtained. Following the procedure of part B, commencing with 2-(4-methoxybenzoyl)-4-methylphenyl chloroformate and substituting 3-methylpiperidine for dimethylamine, 2-(4-methoxybenzoyl)-4-methylphenyl (2-methylpentamethylene)carbamate is obtained.

*Example 24.—3-benzoylphenyl (3-methylpentamethylene)carbamate*

Following the procedure of Example 11, part A, substituting 3-hydroxybenzophenone for the 2,4'-dimethyl-4-hydroxy-5-isopropylbenzophenone, the respective chloroformate is obtained. Following the procedure of part B, commencing with 3-benzoylphenyl chloroformate and substituting 4-methylpiperidine for dimethylamine, 3-benzoylphenyl (3-methylpentamethylene)carbamate is obtained.

*Example 25.—2(3,4-difluorobenzoyl)phenyl (2,3-diethylpentamethylene)carbamate*

Following the procedure of Example 11, part A, substituting 3',4'-difluoro-2-hydroxybenzophenone for 2,4'-dimethyl-4-hydroxy-5-isopropylbenzophenone, the respective chloroformate is obtained. Following the procedure of part B, commencing with 2-(3,4-difluorobenzoyl)phenyl chloroformate and substituting 3,4-diethylpiperidine for dimethylamine, 2-(3,4-difluorobenzoyl)phenyl (2,3-diethylpentamethylene) carbamate is obtained.

*Example 26.—6-benzoyl-2,4-dichlorophenyl (1-isopropyltetramethylene)carbamate*

Following the procedure of Example 11, part A, substituting 3,5-dichloro-2-hydroxybenzophenone, for 2,4'-dimethyl-4-hydroxy-5-isopropylbenzophenone, the respective chloroformate is obtained. Following the procedure of part B, commencing with 6-benzoyl-2,4-dichlorophenyl chloroformate and substituting 2-isopropylpyrrolidine for dimethylamine, 6-benzoyl-2,4-dichlorophenyl (1-isopropyltetramethylene)carbamate is obtained.

*Example 27.—2-benzoyl-5-butenyloxyphenyl (2,5-dimethylhexamethylene)carbamate*

Following the procedure of Example 11, part A, substituting 4-butenyloxy-2-hydroxybenzophenone for 2,4'-dimethyl-4-hydroxy-5-isopropylbenzophenone, the respective chloroformate is obtained. Following the procedure of part B, commencing with 2-benzoyl-5-butenyloxyphenyl chloroformate and substituting 3,6-dimethylhexamethylenimine for dimethylamine, 2-benzoyl-5-butenyl-(2,5-dimethylhexamethylene)carbamate is obtained.

*Example 28.—4-benzoylphenyl (3-oxapentamethylene) carbamate*

Following the procedure of Example 11, part A, substituting 4-hydroxybenzophenone for 2,4'-dimethyl-4-hydroxy-5-isopropylbenzophenone, the respective chloroformate is obtained. Following the procedure of part B, commencing with 4-benzoylphenyl chloroformate and substituting morpholine for dimethylamine, 4-benzoylphenyl (3-oxapentamethylene)carbamate is obtained.

*Example 29.—4-benzoylphenyl (3-thiapentamethylene) carbamate*

Following the procedure of Example 28, part B, commencing with 4-benzoylphenyl chloroformate and substituting thiamorpholine for morpholine, 4-benzoylphenyl (3-thiapentamethylene)carbamate is obtained.

*Example 30.—4-benzoylphenyl (3-oxahexamethylene) carbamate*

Following the procedure of Example 28, part B, commencing with 4-benzoylphenyl chloroformate and substituting homomorpholine for morpholine, 4-benzoylphenyl (3-oxahexamethylene)carbamate is obtained.

In place of the benzophenones used in the foregoing examples the following can be substituted to form the corresponding carbamates:

3-allyl-4-hydroxy-,
3-allyl-5-chloro-2-hydroxy-,
2-allyl-3-hydroxy-4,6-dimethyl-,
4-allyloxy-2-hydroxy-,
3-bromo-5-fluoro-4-hydroxy-,
4-bromo-2-hydroxy-,
2-bromo-2'-hydroxy-,
3'-bromo-2-hydroxy-,
5-bromo-2-hydroxy,
4-butoxy-2-hydroxy-,
4'-butoxy-2-hydroxy-4-methoxy-,
4-butoxy-2-hydroxy-2',4'-dimethoxy-,
4-butoxy-2-hydroxy-4'-nitro-,
4'-btuyl-2-hydroxy-4-methoxy-,
4'-tert.butyl-2-hydroxy-4-methoxy,
5-tert.butyl-2'-chloro-2-hydroxy-,
5-tert.butyl-2-hydroxy-,
5-tert.butyl-2-hydroxy-4'-methoxy-,
5-tert.butyl-2-hydroxy-4'-methyl-,
2-chloro-2'-hydroxy-,
2-chloro-5-hydroxy-,
5-chloro-2-hydroxy-,
2-chloro-4'-hydroxy-,
3-chloro-4'-hydroxy-,
4-chloro-4'-hydroxy-,
3'-chloro-2-hydroxy-,
4'-chloro-2-hydroxy-,
2'-chloro-2-hydroxy-4-methoxy-,
4'-chloro-2-hydroxy-4-methoxy-,
4'-chloro-2-hydroxy-4-methyl-,
4'-chloro-4-hydroxy-2-methyl-,
2'-chloro-2-hydroxy-5-methyl-,
3'-chloro-2-hydroxy-5-methyl-,
4'-chloro-2-hydroxy-5-methyl-,
2'-chloro-2-hydroxy-3-methyl-,
3'-chloro-2-hydroxy-3-methyl-,
4'-chloro-2-hydroxy-3-methyl-,
3'-chloro-2-hydroxy-4-methyl-,
2'-chloro-2-hydroxy-4-methyl-,
3'-chloro-4-hydroxy-2-methyl-,
3-chloro-4-hydroxy-4'-nitro-,
4-chloro-2'-hydroxy-4'-nitro-,
5-chloro-2'-hydroxy-4'-nitro-,
3,5-dibromo-2-hydroxy-,
2',5-dichloro-2-hydroxy-,
2',3-dichloro-2-hydroxy-,
3,4'-dichloro-2-hydroxy-,
2,4-dichloro-4'-hydroxy-,
4,6-dichloro-2-hydroxy-,
3,4'-dichloro-4-hydroxy-,
4',5-dichloro-2-hydroxy-,
2,4-dichloro-2'-hydroxy-4'-nitro-,
2,4-dichloro-2'-hydroxy-5'-methyl-,
3,4-dichloro-2'-hydroxy-5'-methyl-,
2',5-dichloro-2-hydroxy-4-methyl-,
3,5-di-tert.butyl-4-hydroxy-,
2',5'-diethoxy-2-hydroxy-3,6-dimethoxy-,
3,6-diethoxy-2-hydroxy-2',5'-dimethoxy-,
4-ethoxy-2-hydroxy-,
4'-ethoxy-2-hydroxy-4-methoxy-,
2'-ethoxy-2-hydroxy-4,6-dimethoxy-,
4-ethoxy-2-hydroxy-2',4'-dimethoxy-,
4-ethoxy-2'-hydroxy-2,4'-dimethoxy-,
5-ethyl-2-hydroxy-,
3-fluoro-4-hydroxy-,
5-fluoro-2-hydroxy-,
3-fluoro-4-hydroxy-5-iodo-,
5-fluoro-2-hydroxy-4'-methoxy-,
5-fluoro-2-hydroxy-3'-methyl-,
4'-fluoro-2-hydroxy-3-nitro-,
4'-fluoro-2-hydroxy-5-nitro-,
2-hydroxy-3,4-dimethoxy-,
4-hydroxy-3',4'-dimethoxy-,
4-hydroxy-3,4'-dimethoxy-,
2-hydroxy-3',4-dimethoxy-,
2-hydroxy-4,4'-dimethoxy-,
2-hydroxy-4,5-dimethoxy-,
2-hydroxy-4,6-dimethoxy-,
3'-hydroxy-2,4-dimethoxy-,
4-hydroxy-3,5-dimethoxy-,
4'-tert.butyl-2-hydroxy-4-methoxy-,
2-hydroxy-4,6-dimethoxy-3-methyl-,
2'-hydroxy-2,4-dimethyl-,
2-hydroxy-3,4-dimethyl-,
2-hydroxy-3,6-dimethyl-,
2-hydroxy-4,6,dimethyl-,
2-hydroxy-4,5-dimethyl-,
4-hydroxy-3,5-dimethyl-,
2-hydroxy-4,4'-dinitro-,
2-hydroxy-4',6'-dimethyl-3-nitro-,
2-hydroxy-4-isobutoxy-2',4'-dimethoxy-,
2-hydroxy-4'-isobutoxy-2',4-dimethoxy-,
2-hydroxy-4-isopropenyloxy-,
4-hydroxy-5-isopropyl-2-methyl-,
2-hydroxy-5-isopropyl-4-methyl-,
5-hydroxy-2-isopropyl-2-methyl-,
2-hydroxy-3-isopropyl-6-methyl-,
3'-hydroxy-5-isopropyl-6-methyl-,
2-hydroxy-3-methoxy-,
2-hydroxy-4-methoxy-,
3-hydroxy-4-methoxy-,
4'-hydroxy-3-methoxy-,
2-hydroxy-4'-methoxy-,
3-hydroxy-4'-methoxy-,
2-hydroxy-4-methoxy-3-methyl-,
2-hydroxy-4-methoxy-3'-methyl-,
2-hydroxy-4-methoxy-4'-methyl-,
2-hydroxy-4'-methoxy-4-methyl-,
4-hydroxy-3-methoxy-2-nitro-,
2-hydroxy-4-methoxy-4'-nitro-,
2-hydroxy-4-methoxy-5-nitro-,
5-hydroxy-2-methoxy-4'-nitro-,
2-hydroxy-4-methoxy-3'-propoxy-,
2-hydroxy-4'-methyl-,
2-hydroxy-4-methyl-,
2-hydroxy-5-methyl-,
2-hydroxy-6-methyl-,
3-hydroxy-4-methyl-,
4-hydroxy-2-methyl-,
4-hydroxy-3-methyl-,
4'-hydroxy-3-methyl-,
4-hydroxy-4'-methyl-,
2-hydroxy-3-methyl-,
2-hydroxy-3-methyl-3'-nitro-,
2-hydroxy-4-methyl-3'-nitro-,
2-hydroxy-5-methyl-3-nitro-,
4-hydroxy-2-methyl-3'-nitro-, 5-hydroxy-2-methyl-3'-nitro-,
2-hydroxy-3-methyl-4'-nitro-,
2-hydroxy-5-methyl-4'-nitro-,
2-hydroxy-4-methyl-4'-nitro-,
2-hydroxy-6-methyl-3-nitro-,
2-hydroxy-6-methyl-4'-nitro-,
4-hydroxy-2-methyl-4'-nitro-,
4-hydroxy-3-methyl-4'-nitro-,
2-hydroxy-4-methylallyloxy-,
2-hydroxy-2'-nitro-,
2-hydroxy-3-nitro-,
2-hydroxy-3'-nitro-,
2-hydroxy-4-nitro-,
2-hydroxy-5-nitro-,
2-hydroxy-4'-nitro-,
4'-hydroxy-2-nitro-,
4'-hydroxy-3-nitro-,
4-hydroxy-3-nitro-,
2-hydroxy-4-propenyloxy-,
3-hydroxy-4-propyl-,
2-hydroxy-2',3,5',6-tetramethoxy-,
2-hyldroxy-3',4,4',5-tetramethoxy-,
2-hydroxy-2',4,5',6-tetramethoxy-,
2-hydroxy-2',4,4',6-tetramethoxy-,
2-hydroxy-2',3,4-trimethoxy-,
2-hydroxy-2',4,6-trimethoxy-,
2-hydroxy-3',4,4'-trimethoxy-,
4-hydroxy-3,3',4'-trimethoxy-,
4-hydroxy-2,3',4'-trimethoxy-, and
2-hydroxy-2',4,4'-trimethoxybenzophenones.

The compounds of the invention have demonstrated anti-inflammatory activity as shown by the granuloma pouch technique in rats.

The compounds of the invention have antifungal activity, for example, against *Microsporum canis, Trichophyton rubrum, Alternaria solani,* and *Sclerotinia fructicola,* and they can be applied to surfaces contaminated with such fungi to inhibit the growth of these organisms.

The compounds of the present invention are useful in the preparation of a variety of pharmaceutical compositions. Preferably the compositions are prepared in unit dosage form, i.e., each unit containing a predetermined amount of the therapeutic compound of the present invention, for oral, parenteral and topical administration. For oral administration the compositions can take the form of tablets, capsules, boluses, pills, powders, granules, feeds, syrups, elixirs, and the like. Topical administration can be in the form of ointments, creams, lotions, solutions, suspensions, sprays, and powders. For parenteral administration sterile solutions and suspensions can be prepared in vehicles containing water, ethanol, glycerol, propylene glycol, polyalkylene glycols, vegetable oils, and the like.

The compositions, in the appropriate form, can be administered orally and parenterally for systemic treatment, or topically such as on the skin, or locally such as for treating mastitis in cattle, or parenterally for local treatment such as injection into the joint cavity, tendon sheath, and bursa.

The compositions provide the veterinarian with a method for treating inflammation in large and small animals as well as birds and poultry. The animals and birds can be commercial animals raised for profit as well as animals kept for pets and research. Inflammatory conditions which can be treated include, but are not limited to, enteritis, iritis, retained placenta, laminitis, rheumatoid and traumatic arthritis, osteoarthritis, periostitis, tendonitis, tenosynovitis, bursitis, and myositis.

The dosage of the compounds of the present invention depends upon the particular subject treated and the subject's age, weight and condition, as well as the particular condition being treated, its severity and route of administration. In general a dose of about 1 mg. to 45 mg. per kg. of body weight given daily in single or divided doses, or about 75 to 3000 mg. per day, embraces the effective therapeutic dosage for most conditions for which the said compounds are effective.

Advantageously the compounds of the present invention do not have the undesirable side-effects encountered with steroid and other types of anti-inflammatory agents. For example, there is no marked water, sodium or potassium retention nor is there the development of gastric ulceration or other distress.

The following examples illustrate the preparation of pharmaceutical dosage forms but are not to be construed as limiting.

*Example 31*

One thousand scored tablets for oral administration, each containing 500 mg. of 4-benzoylphenyl methylcarbamate are prepared from the following types and amounts of ingredients:

| | Gm. |
|---|---|
| 4-benzoylphenyl methylcarbamate | 500 |
| Lactose | 150 |
| Corn starch | 65 |
| Magnesium stearate | 25 |
| Light liquid petrolatum | 3 |

The ingredients are thoroughly mixed and slugged. The slugs are broken down by forcing through a screen and the resulting granules are then compressed into tablets, each tablet containing 500 mg. of 4-benzoylphenyl methylcarbamate.

Following the above formulation, 100 boluses for large animal use are similarly prepared, by enlarging the tablet size ten times, each bolus containing 5000 mg. of 4-benzoylphenyl methylcarbamate.

Following the above formulation, but using 50 gm., 100 gm., and 250 gm. of 4-benzoylphenyl methylcarbamate instead of 500 gm., there are prepared scored tablets each containing 50 mg., 100 mg., and 250 mg., respectively, of active ingredient.

*Example 32*

One thousand cc. of a sterile aqueous suspension for parenteral administration and containing 250 mg. of 4-benzoylphenyl methylcarbamate per cc. is prepared from the following types and amounts of ingredients:

| | | |
|---|---|---|
| 4-benzoylphenyl methylcarbamate | gm | 250 |
| Polyethylene glycol 4000, U.S.P. | gm | 30 |
| Procaine hydrochloride | gm | 20 |
| Myristyl gamma picolinium chloride | gm | 0.2 |
| Water for injection q.s. | cc | 1000 |

*Example 33*

One thousand cc. of an aqueous syrup suspension for oral administration containing 500 mg. of 4-benzoylphenyl methylcarbamate in each 5 cc. dose is prepared from the following types and amounts of ingredients:

| | | |
|---|---|---|
| 4-benzoylphenyl methylcarbamate | gm | 100 |
| Citric acid | gm | 2 |
| Benzoic acid | gm | 1 |
| Sucrose | gm | 700 |
| Tragacanth | gm | 5 |
| Oil of lemon | cc | 2 |
| Deionized water q.s. | cc | 1000 |

The citric acid, benzoic acid, sucrose, tragacanth, and oil of lemon are dispersed in sufficient water to make 850 cc. of solution. The carbamate, finely divided, is stirred into the syrup until uniformly distributed. Sufficient water is added to make 1000 cc.

The syrup can be administered to small animals, 60 to 100 lbs., at a teaspoonful dosage. For large animals such as a horse, one to two fluid ounces of the composition can be diluted with milk or water to make 12 fluid ounces administered as a drench.

*Example 34*

500 lbs. of a composition for feeding turkeys with enteritis are prepared from the following types and amounts of ingredients:

| | | |
|---|---|---|
| 4-benzoylphenyl methylcarbamate | gm | 75 |
| Ground oats | lb | 30 |
| Meat and bone scraps 50% [1] | lb | 30 |
| Fish meal 60% [1] | lb | 20 |
| Alfalfa meal, dehydrated 17% [1] | lb | 30 |
| Ground corn | lb | 158 |
| Wheat bran | lb | 15 |
| Wheat std. midds. | lb | 30 |
| Soybean oil meal 50% [1] | lb | 150 |
| Dicalcium phosphate | lb | 9.5 |
| Calcium carbonate | lb | 14 |
| Trace mineralized salt | lb | 2.5 |
| Yellow fat | lb | 10 |
| Vitamin D premix | lb | 0.3 |
| B-vitamin supplement | lb | 0.45 |
| Trace mineral premix | lb | 0.3 |

[1] The percentages refer to the percent of protein present.

*Example 35*

Following the procedures of the preceding Examples 31 to 34, inclusive, compositions are similarly prepared substituting an equal amount of a compound prepared according to Examples 2 to 30, inclusive, for the 4-benzoylphenyl methylcarbamate shown.

What is claimed is:
1. A compound of the formula:

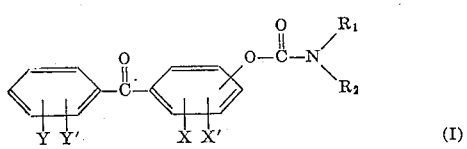

(I)

wherein $R_1$ and $R_2$ taken individually represent a member selected from the group consisting of hydrogen, alkyl of from 1 to 4 carbon atoms, inclusive, and alkenyl of from 3 to 4 carbon atoms, inclusive, and taken together with —N< represent saturated heterocyclic amino selected from the group consisting of unsubstituted and mono- and polyalkyl substituted piperidino, morpholino, thiamorpholino, pyrrolidino, hexamethyleneimino, heptamethyleneimino, octamethyleneimino, and homomorpholino wherein each alkyl is of from 1 to 4 carbon atoms, inclusive; and X, X', Y, and Y' are selected from the group consisting of hydrogen, halogen, nitro, alkyl and alkenyl of from 1 to 4 carbon atoms, inclusive, and alkoxy and alkenyloxy of from 1 to 4 carbon atoms, inclusive.

2. 4-benzoylphenyl methylcarbamate.

References Cited

UNITED STATES PATENTS

| | | | |
|---|---|---|---|
| 2,362,508 | 11/1944 | Stevens et al. | 260—479 |
| 2,485,550 | 10/1949 | Aeschlimann et al. | 260—479 |
| 2,677,698 | 5/1954 | Deutschman et al. | 260—479 |
| 2,787,631 | 4/1957 | Stevens | 260—463 |
| 2,873,291 | 2/1959 | Spiegler | 260—463 |
| 2,951,834 | 9/1960 | Scott | 260—463 X |
| 3,012,068 | 12/1961 | Shulgin | 260—479 |
| 3,060,225 | 10/1962 | Shulgin | 260—479 |
| 3,091,633 | 5/1963 | Strube | 260—479 |
| 3,096,359 | 7/1963 | Caldwell et al. | 260—463 |

OTHER REFERENCES

Brostoff et al.: Journal of Pharmacy and Pharmacology, vol. 13, pp. 65–71 (1961).

Dinglinger, Justus Liebig's Annalen der Chemie, vol. 311, pp. 147–153 (1900).

Hodgson et al.: Biochimica et Biophysica Acta, vol. 42, pp. 184–186 (1960).

LORRAINE A. WEINBERGER, *Primary Examiner.*

CHARLES PARKER, *Examiner.*

I. R. PELLMAN, FLOYD D. HIGEL, KAREN I. ROSE,
*Assistant Examiners.*